(12) United States Patent
Ogushi et al.

(10) Patent No.: US 10,502,115 B2
(45) Date of Patent: Dec. 10, 2019

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventors: Masataka Ogushi, Susono (JP); Arifumi Matsumoto, Gotemba (JP); Yoshihisa Tsukamoto, Susono (JP); Hiromasa Nishioka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

(21) Appl. No.: 15/909,530

(22) Filed: Mar. 1, 2018

(65) Prior Publication Data

US 2018/0252133 A1  Sep. 6, 2018

(30) Foreign Application Priority Data

Mar. 2, 2017  (JP) ................ 2017-039173

(51) Int. Cl.

| *F01N 3/20* | (2006.01) |
| *B01D 53/94* | (2006.01) |
| *F01N 11/00* | (2006.01) |
| *F01N 9/00* | (2006.01) |

(52) U.S. Cl.
CPC ......... *F01N 3/208* (2013.01); *B01D 53/9418* (2013.01); *B01D 53/9431* (2013.01); *B01D 53/9495* (2013.01); *F01N 9/00* (2013.01); *F01N 11/00* (2013.01); *F01N 2550/02* (2013.01); *F01N 2560/06* (2013.01); *F01N 2610/02* (2013.01); *F01N 2610/148* (2013.01); *F01N 2900/1402* (2013.01); *F01N 2900/1602* (2013.01);

(Continued)

(58) Field of Classification Search
CPC ............ B01D 53/9418; B01D 53/9431; B01D 53/9495; F01N 11/00; F01N 3/208; F01N 9/00; F01N 2550/02; F01N 2560/06; F01N 2610/02; F01N 2610/148; F01N 2900/1402; F01N 2900/1602; F01N 2900/1621; Y02T 10/24; Y02T 10/47
See application file for complete search history.

(56) References Cited

FOREIGN PATENT DOCUMENTS

| JP | 2014-25398 | 2/2014 |
| JP | 2014025398 A * | 2/2014 |

\* cited by examiner

*Primary Examiner* — Brandon D Lee
(74) *Attorney, Agent, or Firm* — Finnegan, Henderson, Farabow, Garrett & Dunner, LLP (57) ABSTRACT

In order to supply a reducing agent to an NOx catalyst in an appropriate manner when the temperature of the NOx catalyst is high, in cases where the temperature of the NOx catalyst is equal to or higher than a predetermined temperature at which ammonia is oxidized, and in cases where an NOx reduction rate in the NOx catalyst is smaller than a predetermined lower limit reduction rate, when the addition of the additive agent is carried out at least twice by changing an equivalent ratio with respect to an amount of NOx flowing into the NOx catalyst, the equivalent ratio in equivalent ratio control is made larger in the case where an amount of change of an amount of reduction of NOx accompanying a change of the equivalent ratio is larger than an amount of change of an amount of oxidation of ammonia accompanying the change of the equivalent ratio, than in the case where it is smaller than that.

5 Claims, 5 Drawing Sheets

(52) U.S. Cl.
CPC ....... *F01N 2900/1621* (2013.01); *Y02T 10/24* (2013.01); *Y02T 10/47* (2013.01)

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2017-039173 filed on Mar. 2, 2017 the entire contents of which are incorporated by reference herein.

TECHNICAL FIELD

The present disclosure relates to an exhaust gas purification apparatus for an internal combustion engine.

Description of the Related Art

There has been known an NOx selective catalytic reduction catalyst (hereinafter, also referred to simply as an "NOx catalyst") which purifies (removes or reduces) NOx contained in an exhaust gas from an internal combustion engine by using ammonia as a reducing agent. At the upstream side of this NOx catalyst, there is arranged an addition valve or the like which serves to add ammonia or a precursor of ammonia (hereinafter, ammonia or a precursor thereof being also referred to as an "additive agent") into the exhaust gas. As the precursor of ammonia, there can be mentioned urea, for example.

In such an NOx catalyst, when the temperature of the NOx catalyst becomes high, ammonia adsorbed therein desorbs so that the ammonia can flow out from the NOx catalyst. In addition, when the temperature of the NOx catalyst becomes high, ammonia can be oxidized to produce NOx in the NOx catalyst. Moreover, when ammonia decreases due to the oxidation of ammonia, ammonia runs short in the NOx catalyst, so it can become difficult to remove or reduce NOx. Here, there has been known a technology in which when the NOx catalyst is in a state of high temperature, NOx is removed or reduced by intermittently increasing an amount of addition of an additive agent more than a regular amount (for example, refer to a first patent literature). Even if an amount of adsorption of ammonia on a surface of the NOx catalyst comes close to saturation in a period of time in which the amount of addition of the additive agent is increased, in the following period of time in which the regular amount of ammonia is added, ammonia moves into the interior of the NOx catalyst, or ammonia further reacts with NOx, so that the amount of adsorption of ammonia on the surface of the NOx catalyst can have a margin. With this, the outflow of ammonia from the NOx catalyst is suppressed.

CITATION LIST

Patent Literature

Patent Literature 1: Japanese patent application laid-open publication No. 2014-025398

SUMMARY

Technical Problem

When the NOx catalyst becomes high temperature, ammonia will be oxidized to NOx in reactive sites of CuO or the like contained in the NOx catalyst. This CuO increases with the progress of deterioration of the NOx catalyst. That is, the more the deterioration of the NOx catalyst progresses, the more easily ammonia becomes oxidized to NOx. Accordingly, when the amount of addition of ammonia is made to increase in order to reduce the NOx produced by the oxidation of ammonia or in order to replenish the oxidized ammonia, the amount of ammonia to be oxidized in the NOx catalyst will be increased. For this reason, NOx may flow out from the NOx catalyst. In addition, even if the amount of addition of ammonia is made to increase unduly or unreasonably, ammonia desorbs from the NOx catalyst when the NOx catalyst is at high temperature, so that ammonia may flow out from the NOx catalyst. For that reason, the amount of consumption of ammonia will increase.

Accordingly, the present disclosure has for its object to supply a reducing agent to an NOx catalyst in an appropriate manner when the temperature of the NOx catalyst is high.

Solution to Problem

In order to achieve the above-mentioned object, the present disclosure resides in an exhaust gas purification apparatus for an internal combustion engine which comprises: an NOx selective catalytic reduction catalyst that is arranged in an exhaust passage of the internal combustion engine and selectively reduces NOx in an exhaust gas by using ammonia as a reducing agent; an addition valve that is arranged in said exhaust passage at the upstream side of said NOx selective catalytic reduction catalyst and configured to add an additive agent, which is ammonia or a precursor of ammonia, into the exhaust gas; a temperature sensor configured to acquire a temperature of said NOx selective catalytic reduction catalyst: and a controller configured to carry out equivalent ratio control in which an amount of the additive agent corresponding to an amount of NOx flowing into said NOx selective catalytic reduction catalyst and an equivalent ratio is added from said addition valve; wherein in cases where the temperature acquired by said temperature sensor is equal to or higher than a predetermined temperature at which ammonia is oxidized, and in cases where an NOx reduction rate in said NOx selective catalytic reduction catalyst is smaller than a predetermined lower limit reduction rate, when the addition of the additive agent from said addition valve is carried out at least twice by changing the equivalent ratio with respect to the amount of NOx flowing into said NOx selective catalytic reduction catalyst, said controller configured to make the equivalent ratio in said equivalent ratio control larger in the case where an amount of change of an amount of reduction of NOx accompanying a change of the equivalent ratio is larger than an amount of change of the amount of oxidation of ammonia accompanying the change of the equivalent ratio, than in the case where it is smaller than that.

The equivalent ratio control is control in which an amount of the additive agent corresponding to the amount of the NOx flowing into the NOx catalyst. The equivalent ratio referred to herein is a ratio of an amount of the additive agent to be added from the addition valve with respect to an amount of additive agent theoretically able to reduce the NOx flowing into the NOx catalyst without excess and deficiency. In the following, in cases where the equivalent ratio will be referred to, it is assumed to indicate this equivalent ratio. In the equivalent ratio control, the equivalent ratio may also be set to values other than 1. The predetermined lower limit reduction rate is an NOx reduction rate which corresponds to a lower limit value of an allowable range. In cases where the temperature of the NOx catalyst is equal to or higher than the predetermined temperature, the additive agent added from the addition valve is oxidized. As a result of this, the NOx reduction rate decreases or becomes low. Then, the larger the degree of the deterioration of the NOx catalyst, the more the amount of the additive agent to be oxidized in the NOx catalyst increases, and the more the NOx reduction rate drops. Here, it has been found out that the relation between the amount of oxidation of ammonia and the amount of reduction of NOx becomes a proportionality relation corresponding to the degree of the deterioration of the NOx catalyst. That is, when the addition of the additive agent is carried out at least twice by changing the equivalent ratio, the relation between the amount of change of the amount of oxidation of ammonia and the amount of change of the amount of reduction of NOx changes corresponding to the degree of the deterioration of the NOx catalyst. Then, it has been found out that in cases where the amount of change of the amount of reduction of NOx is larger than the amount of change of the amount of oxidation of ammonia, the NOx reduction rate is improved by increasing the additive agent. On the other hand, in cases where the amount of change of the amount of reduction of NOx is smaller than the amount of change of the amount of oxidation of ammonia, when the additive agent is increased, the outflow of NOx from the NOx catalyst will increase. In this case, it is better not to increase the equivalent ratio. In such a case, the outflow of NOx from the NOx catalyst can be decreased by decreasing the equivalent ratio.

In addition, in cases where said amount of change of the amount of reduction of NOx is larger than said amount of change of the amount of oxidation of ammonia, said controller can make the equivalent ratio in said equivalent ratio control larger than 1.

That is, in cases where the amount of change of the amount of reduction of NOx is more than the amount of change of the amount of oxidation of ammonia, the amount of increase of the amount of reduction of NOx becomes more than the amount of increase of the amount of oxidation of ammonia even if the equivalent ratio is made to increase, and hence, the NOx reduction rate is improved or increased. In such a case, even if the equivalent ratio is made larger than 1, the NOx reduction rate can be improved.

Moreover, in cases where said amount of change of the amount of reduction of NOx is larger than said amount of change of the amount of oxidation of ammonia, said controller can adjust the equivalent ratio in said equivalent ratio control in such a manner that the concentration of ammonia in the exhaust gas flowing out from said NOx selective catalytic reduction catalyst becomes equal to or less than a predetermined upper limit concentration.

Here, when the equivalent ratio is made too large, ammonia becomes unable to be fully adsorbed to the NOx catalyst, and ammonia may flow out from the NOx catalyst. In contrast to this, the controller adjusts the equivalent ratio in such a manner that the concentration of ammonia in the exhaust gas flowing out from the NOx catalyst becomes equal to or less than the predetermined upper limit concentration, whereby the concentration of ammonia in the exhaust gas flowing out from the NOx catalyst can be decreased. Here, note that the predetermined upper limit concentration is a concentration of ammonia which corresponds to an upper limit value of the allowable range.

Further, said controller can adjust the equivalent ratio in said equivalent ratio control in such a manner that the NOx reduction rate in said NOx selective catalytic reduction catalyst becomes equal to or more than said predetermined lower limit reduction rate.

In this manner, the equivalent ratio can be adjusted so that the NOx reduction rate falls within the allowable range.

In addition, in cases where said amount of change of the amount of reduction of NOx is equal to or less than said amount of change of the amount of oxidation of ammonia, said controller can make the equivalent ratio in said equivalent ratio control equal to or less than 1.

In cases where the amount of change of the amount of reduction of NOx is smaller than the amount of change of the amount of oxidation of ammonia, when the equivalent ratio is made to increase, the outflow of NOx from the NOx catalyst can increase. In such a case, the outflow of NOx from the NOx catalyst can be decreased by adjusting the equivalent ratio to 1 or below. In this case, the equivalent ratio may be adjusted to 0.

Advantageous Effects

According to the present disclosure, when the temperature of an NOx catalyst is high, a reducing agent can be supplied to the NOx catalyst in an appropriate manner.

DESCRIPTION OF THE EMBODIMENTS

Hereinafter, the modes for carrying out the present disclosure will be exemplarily described in detail based on an embodiment with reference to the attached drawings. However, the dimensions, materials, shapes, relative arrangements and so on of component parts described in the embodiment are not intended to limit the scope of the present disclosure to these alone in particular as long as there are no specific statements.

(First Embodiment)

Figure 1:
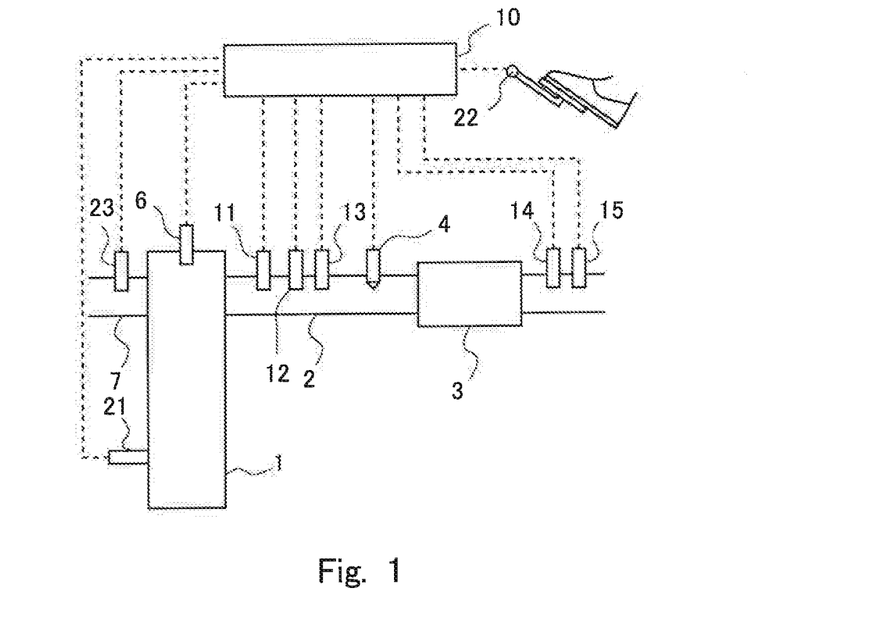
FIG. 1 is a view showing the schematic construction of an internal combustion engine as well as its intake and exhaust systems according to an embodiment of the present disclosure.

FIG. 1 is a view showing the schematic construction of an internal combustion engine 1 as well as its intake and exhaust systems according to a first embodiment of the present disclosure. The internal combustion engine 1 is a diesel engine for driving a vehicle. However, the internal combustion engine 1 may be a gasoline engine. An exhaust passage 2 is connected to the internal combustion engine 1. In the exhaust passage 2, there is arranged an NOx selective catalytic reduction catalyst 3 (hereinafter, referred to as an "NOx catalyst 3") which serves to selectively reduce NOx in an exhaust gas with the use of ammonia as a reducing agent.

In the exhaust passage 2 at the upstream side of the NOx catalyst 3, there is arranged an addition valve 4 which serves to add urea water as a precursor of ammonia into an exhaust gas. The urea water added from the addition valve 4 is hydrolyzed into ammonia, and the ammonia thus generated is adsorbed to the NOx catalyst 3. This ammonia is used as the reducing agent in the NOx catalyst 3. Here, note that the addition valve 4 may add ammonia in place of the urea water. Hereinafter, the precursor of ammonia and ammonia are also each referred to as an "additive agent". Here, note that in this embodiment, the addition valve 4 corresponds to an addition valve in the present disclosure.

Further, in the exhaust passage 2 at the upstream side of the addition valve 4, there are arranged a first NOx sensor 11 that detects the concentration of NOx in the exhaust gas flowing into the NOx catalyst 3, an air fuel ratio sensor 12 that detects the air fuel ratio of the exhaust gas flowing into the NOx catalyst 3, and a temperature sensor 13 that detects the temperature of the exhaust gas flowing into the NOx catalyst 3. On the other hand, in the exhaust passage 2 at the downstream side of the NOx catalyst 3, there are arranged a second NOx sensor 14 that detects the concentration of NOx in the exhaust gas flowing out from the NOx catalyst 3, and an ammonia sensor 15 that detects the concentration of ammonia in the exhaust gas flowing out from the NOx catalyst 3. Here, note that in cases where the second NOx sensor 14 is of the type that detects ammonia as well as NOx, the concentration of NOx in the exhaust gas flowing out from the NOx catalyst 3 can be detected by subtracting the detected value of the ammonia sensor 15 from the detected value of the second NOx sensor 14. In addition, on the internal combustion engine 1, there are mounted fuel injection valves 6 (though only one is shown) for injecting fuel into individual cylinders, respectively.

In addition, an intake passage 7 is connected to the internal combustion engine 1. An air flow meter 23 for detecting the amount of intake air in the internal combustion engine 1 is arranged in the intake passage 7.

Then, an ECU 10, which is an electronic control unit, is provided as a controller in combination with the internal combustion engine 1. The ECU 10 controls the internal combustion engine 1, an exhaust gas purification apparatus, and so on. The above-mentioned various kinds of sensors, a crank position sensor 21 and an accelerator opening sensor 22 are electrically connected to the ECU 10, and the detected values of these individual sensors are passed or transmitted to the ECU 10.

The ECU 10 is able to grasp the operating state of the internal combustion engine 1, such as the engine rotational speed based on the detection of the crank position sensor 21, the engine load based on the detection of the accelerator opening sensor 22, etc. Here, note that in this embodiment, the NOx in the exhaust gas flowing into the NOx catalyst 3 is able to be detected by the first NOx sensor 11, but the NOx contained in the exhaust gas discharged from the internal combustion engine 1 (the exhaust gas before being purified or reduced in the NOx catalyst 3, i.e., the exhaust gas flowing into the NOx catalyst 3) has relation with the operating state of the internal combustion engine, and hence, is also able to be estimated based on the above-mentioned operating state of the internal combustion engine 1. In addition, the ECU 10 is able to estimate the temperature of the NOx catalyst 3 based on the temperature of the exhaust gas detected by the temperature sensor 13. Moreover, the temperature sensor 13 may be a sensor that detects the temperature of the NOx catalyst 3, in place of the temperature of the exhaust gas. Here, note that in this embodiment, the temperature sensor 13 corresponds to a temperature sensor in the present disclosure. Also, the temperature of the NOx catalyst 3 has relation to the operating state of the internal combustion engine 1, so it is also possible to estimate the temperature of the NOx catalyst 3 based on the above-mentioned operating state of the internal combustion engine 1. Further, the ECU 10 can calculate the flow rate of the exhaust gas based on the detected value of the air flow meter 23 and the amount of fuel injection from each of the fuel injection valves 6. On the other hand, the addition valve 4 and the fuel injection valves 6 are connected to the ECU 10 through electrical wiring, so that the addition valve 4 and the fuel injection valves 6 are controlled by the ECU 10.

Moreover, when the temperature of the NOx catalyst 3 is relatively high, the ECU 10 calculates the amount of NOx flowing into the NOx catalyst 3 by the detected value of the first NOx sensor 11 and the flow rate of the exhaust gas, and carries out equivalent ratio control in which an amount of the additive agent corresponding to the amount of the NOx thus calculated is added. Here, note that the equivalent ratio referred to herein is a ratio of an amount of the additive agent to be added from the addition valve 4 with respect to an amount of additive agent theoretically able to reduce the NOx flowing into the NOx catalyst 3 without excess and deficiency.

For example, in cases where a filter for trapping particulate matter (PM) is arranged in the exhaust passage 2 at the upstream side of the NOx catalyst 3, regeneration processing of the filter, which is processing for raising the temperature of the filter, is carried out in order to oxidize the PM trapped in the filter. At this time, the temperature of the NOx catalyst 3 goes up. In addition, for example, in cases where an NOx storage reduction catalyst is arranged in the exhaust passage 2 at the upstream side of the NOx catalyst 3, sulfur poisoning recovery processing for recovering sulfur poisoning of the NOx storage reduction catalyst is carried out. At this time, the temperature of the NOx storage reduction catalyst is caused to go up, so the temperature of the NOx catalyst 3 also goes up, Moreover, at the time of the high load operation of the internal combustion engine 1, exhaust gas of high temperature is discharged from the internal combustion engine 1, so the temperature of the NOx catalyst 3 goes up.

Here, when the temperature of the NOx catalyst 3 becomes relatively high, in cases where the regeneration processing of the filter or sulfur poisoning recovery processing is carried out or in cases where the internal combustion engine 1 is operated at high load, etc., the amount of ammonia, which is able to be adsorbed in the NOx catalyst 3, is decreased, so ammonia desorbs from the NOx catalyst 3. For that reason, the amount of adsorption of ammonia in the NOx catalyst 3 is decreased. Thus, when the temperature of the NOx catalyst 3 becomes relatively high, it becomes difficult to make a sufficient amount of ammonia adsorbed in the NOx catalyst 3 in advance, and hence, the equivalent ratio control is carried out in which the additive agent is added according to the amount of NOx flowing into the NOx catalyst 3. On the other hand, in cases where the temperature of the NOx catalyst 3 is relatively low, for example, ammonia has been made to adsorb to the NOx catalyst 3 in advance in a range where an amount of saturated adsorption is not exceeded, and in cases where the ammonia adsorbed to the NOx catalyst 3 is decreased by the reduction of NOx, etc., an amount of additive agent corresponding to a decreased amount of ammonia is supplied.

Further, when the temperature of the NOx catalyst 3 becomes equal to or higher than a predetermined temperature, ammonia can be oxidized to produce NOx in the NOx catalyst 3. The predetermined temperature referred to herein is a temperature (e.g., 500 degrees C.) at which the rate of oxidation of ammonia begins to increase when a sufficient amount of oxygen is contained in the exhaust gas. Here, note that because the oxidation of ammonia hardly takes place in cases where the temperature of the NOx catalyst 3 is lower than the predetermined temperature, the predetermined temperature may also be a temperature at which ammonia is oxidized (or a temperature at which the oxidation of ammonia begins), or a temperature at which the rate of oxidation of ammonia becomes equal to or more than a predetermined rate. When the temperature of the NOx catalyst 3 becomes equal to or higher than the predetermined temperature, the rate of oxidation of ammonia becomes larger with the rise of the temperature. This predetermined temperature changes according to the kind of NOx catalyst 3, and can be obtained in advance through experiments, simulations, or the like. Then, the predetermined temperature is equal to or higher than a temperature at which ammonia desorbs from the NOx catalyst 3. For that reason, when the temperature of the NOx catalyst 3 is equal to or higher than the predetermined temperature, the equivalent ratio control is carried out by means of the ECU 10.

It is considered that the ease of oxidation of ammonia at the time when the NOx catalyst 3 is at high temperature is associated with the degree of the deterioration of the NOx catalyst 3. Here, the deterioration of the NOx catalyst 3 can be estimated as follows. First, zeolite destruction is caused from $H^+$ acid sites (Bronsted acid sites), etc., by $H_2O$ and heat. That is, lattice defects are caused in acid sites by $H_2O$ and heat. Then, crystal destruction arises from the lattice defects. With this, when ion-exchange Cu separates out from zeolite, active spots will decrease. That is, the NOx catalyst 3 deteriorates. Due to the decrease of such active spots, the NOx reduction performance of the NOx catalyst 3 decreases without regard to the temperature of the NOx catalyst 3. In addition, Cu separated out from zeolite reacts with $O_2$ to produce CuO. This CuO oxidizes ammonia to produce NOx at the time of high temperature. That is, the more CuO is produced due to the progress of deterioration of the NOx catalyst 3, the more easily ammonia becomes oxidized at the time of high temperature. As mentioned above, when the NOx catalyst 3 is at high temperature, the more the deterioration of the NOx catalyst 3 progresses, the more easily ammonia becomes oxidized, and the more difficult it becomes for NOx to be reduced.

Figure 2:
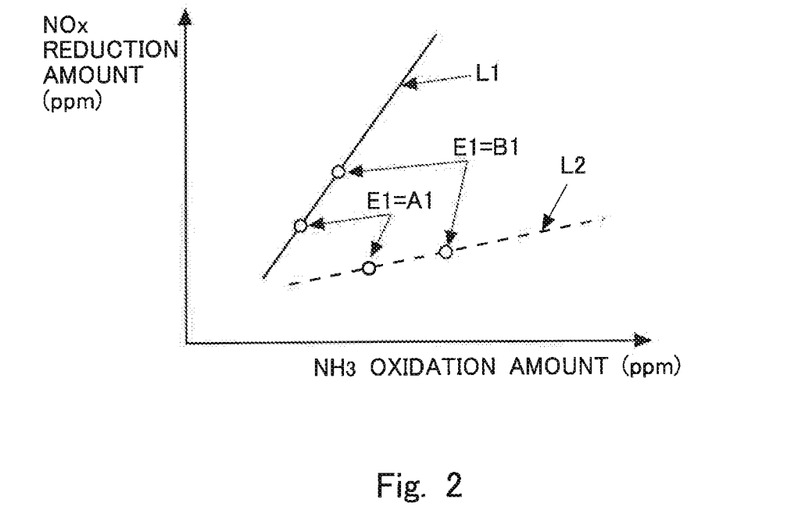
FIG. 2 is a view indicating the relation between an amount of oxidation of ammonia ($NH_3$ oxidation amount) and an amount of reduction of NOx in the case of carrying out a plurality of additions by changing an equivalent ratio.

Here, it has been found out that in cases where a plurality of additions of the additive agent are carried out by changing the equivalent ratio, the relation between the amount of oxidation of ammonia and the amount of reduction of NOx becomes a proportionality relation corresponding to the degree of the deterioration of the NOx catalyst 3. In this embodiment, the equivalent ratio is adjusted based on this finding. Here, FIG. 2 is a view indicating the relation between the amount of oxidation of ammonia ($NH_3$ oxidation amount) and the amount of reduction of NOx in the case of carrying out a plurality of additions by changing the equivalent ratio. In FIG. 2, a solid line L1 indicates a case where the degree of the deterioration of the NOx catalyst 3 is relatively small, and a broken line L2 indicates a case where the degree of the deterioration of the NOx catalyst 3 is relatively large. Here, note that in the following, straight lines indicated by L1 and L2 are also referred to as "characteristic lines".

Figure 3:
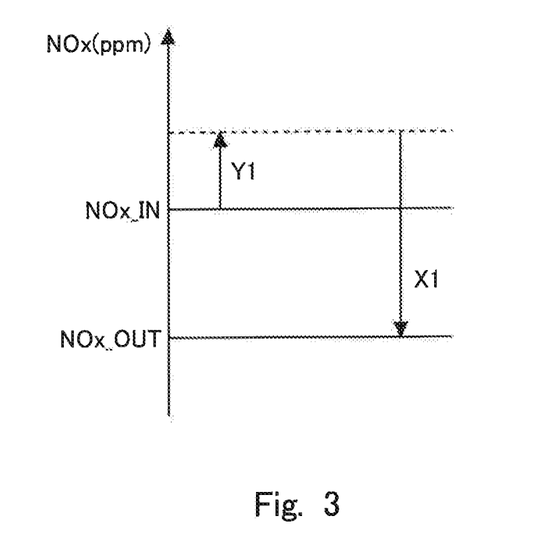
FIG. 3 is a view for explaining a change (increase and decrease) in an NOx concentration when an exhaust gas passes through an NOx catalyst.
Figure 4:
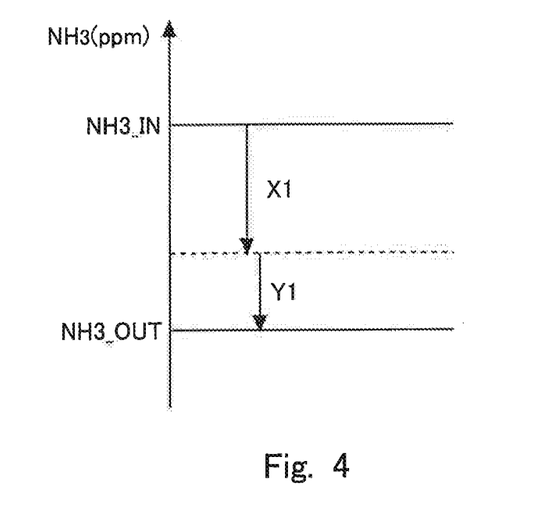
FIG. 4 is a view for explaining a change (increase and decrease) in an ammonia concentration when the exhaust gas passes through the NOx catalyst.

Points indicated by "E1=A1" on L1 and L2 are points in the case of adding the additive agent by setting the equivalent ratio E1 to A1 which is a relatively small value, and points indicated by "E1=B1" on L1 and L2 are points in the case of adding the additive agent by setting the equivalent ratio E1 to B1 which is a relatively large value. Thus, in cases where the equivalent ratio E1 is changed, a point indicated by an amount of ammonia oxidation and an amount of NOx reduction moves on a characteristic line which is decided by the degree of the deterioration of the NOx catalyst 3. The slope or gradient of this characteristic line becomes smaller as the degree of the deterioration of the NOx catalyst 3 is larger. Here, note that the amount of NOx reduction and the amount of ammonia oxidation can be calculated based on the relations indicated in FIG. 3 and FIG. 4, as follows. Here, FIG. 3 is a view for explaining a change (increase and decrease) in the concentration of NOx when the exhaust gas passes through the NOx catalyst 3. FIG. 4 is a view for explaining a change (increase and decrease) in the concentration of ammonia when the exhaust gas passes through the NOx catalyst 3.

Here, the concentration of NOx in the exhaust gas flowing into the NOx catalyst 3 is represented by NOx_IN (ppm), and the concentration of ammonia therein is represented by NH3_IN (ppm). In addition, the concentration of NOx in the exhaust gas flowing out from the NOx catalyst 3 is represented by NOx_OUT (ppm), and the concentration of ammonia therein is represented by NH3_OUT (ppm). In cases where the equivalent ratio control is carried out by setting the equivalent ratio to E1, the following expression 1 is established.

$$\text{NH3\_IN} = E1 \cdot \text{NOx\_IN} \qquad \text{Expression 1}$$

In FIG. 3, when the exhaust gas flows into the NOx catalyst 3, ammonia is oxidized so that the concentration of NOx becomes higher. That is, the concentration of NOx becomes higher by an amount of increase in the concentration of NOx produced by the oxidation of ammonia (here, an amount of oxidation of ammonia being represented by Y1) than the concentration of NOx NOx_IN in the exhaust gas flowing into the NOx catalyst 3. On the other hand, the concentration of NOx in the exhaust gas flowing out from the NOx catalyst 3 is represented by NOx_OUT, so when the concentration of NOx, which is decreased by reducing NOx in the NOx catalyst 3, is represented by an amount of NOx reduction X1, the following expression 2 is established.

$$\text{NOx\_IN} - \text{NOx\_OUT} = X1 - Y1 \qquad \text{Expression 2}$$

In FIG. 4, the concentration of the ammonia having flowed into the NOx catalyst 3 is decreased by the reduction of NOx and the oxidation of the ammonia. For that reason, the following expression 3 is established.

$$\text{NH3\_IN} - \text{NH3\_OUT} = X1 + Y1 \qquad \text{Expression 3}$$

The following expressions 4 and 5 are established from the above-mentioned expressions 1, 2 and 3.

$$X1 = (E1 \cdot \text{NOx\_IN} + \text{NOx\_IN} - \text{NOx\_OUT} - \text{NH3\_OUT})/2 \qquad \text{Expression 4}$$

$$Y1 = (E1 \cdot \text{NOx\_IN} - \text{NOx\_IN} - \text{NOx\_OUT} - \text{NH3\_OUT})/2 \qquad \text{Expression 5}$$

Here, when it is assumed that ammonia is not adsorbed to the NOx catalyst 3 and that ammonia is not oxidized in the NOx catalyst 3, the concentration of ammonia in the exhaust gas flowing out from the NOx catalyst 3 is represented by SL. Because SL corresponds to a concentration of ammonia after the concentration of reacted NOx is decreased from the concentration of ammonia in the exhaust gas flowing into the NOx catalyst 3, the following expression 6 is established.

$$SL = E1 \cdot NOx\_IN - (NOx\_IN - NOx\_OUT) \qquad \text{Expression 6}$$

Here, an actual concentration of ammonia in the exhaust gas flowing out from the NOx catalyst 3 is NH3_OUT, and there is a difference between SL and NH3_OUT. When this difference is represented by N1, the following expression 7 is established.

$$N1 = SL - NH3\_OUT = E1 \cdot NOx\_IN - (NOx\_IN - NOx\_OUT) - NH3\_OUT \qquad \text{Expression 7}$$

It is considered that this difference N1 is a sum total of the ammonia used for oxidation (represented by S1) and the ammonia used for reducing the oxidized ammonia (represented by O1). That is, the following expression 8 is established.

$$N1 = S1 + O1 \qquad \text{Expression 8}$$

Here, when it is assumed that all the oxidized ammonia is reduced by another ammonia, the following expressions 9 and 10 are established.

$$X1 = N1/2 = (E1 \cdot NOx\_IN + NOx\_IN - NOx\_OUT - NH3\_OUT)/2 \qquad \text{Expression 9}$$

$$Y1 = N1/2 + (NOx\_IN - NOx\_OUT) = (E1 \cdot NOx\_IN - NOx\_IN + NOx\_OUT - NH3\_OUT)/2 \qquad \text{Expression 10}$$

The concentration of NOx NOx_IN in the exhaust gas flowing into the NOx catalyst 3 is detected by the first NOx sensor 11. In addition, the concentration of NOx NOx_OUT in the exhaust gas flowing out from the NOx catalyst 3 is detected by the second NOx sensor 14 and the ammonia sensor 15. Moreover, the concentration of ammonia NH3_OUT in the exhaust gas flowing out from the NOx catalyst 3 is detected by the ammonia sensor 15. The equivalent ratio E1 is set by the ECU 10. Accordingly, the amount of NOx reduction X1 can be calculated based on the expression 4 or expression 9 by using the detection values of these sensors and the equivalent ratio E1 set by the ECU 10. Further, the amount of ammonia oxidation Y1 is calculated based on the expression 5 or expression 10 by using the detection values of these sensors and the equivalent ratio E1 set by the ECU 10.

Here, in a characteristic line L1 in FIG. 2, when the equivalent ratio is made to increase, an amount of increase in the amount of NOx reduction is larger than an amount of increase in the amount of ammonia oxidation. That is, an amount of NOx, which is decreased by being reduced in the NOx catalyst 3, is more than the amount of increase of NOx produced by the oxidation of ammonia, so most of the NOx produced by the oxidation of ammonia can be reduced in the NOx catalyst 3. In such a case, the larger the equivalent ratio, the larger the amount of NOx becomes able to be reduced. That is, in cases where the gradient of the characteristic line is larger than 1, the NOx reduction rate is raised by making the equivalent ratio larger. Here, note that in this embodiment, reference is made to the case where the equivalent ratio is made to increase, but a similar consideration can be made for the case where the equivalent ratio is made to decrease. That is, it can be said that in the characteristic line L1 in FIG. 2, when the equivalent ratio is made to decrease, an amount of decrease in the amount of NOx reduction is larger than an amount of decrease in the amount of ammonia oxidation.

On the other hand, in a characteristic line L2 in FIG. 2, when the equivalent ratio is made to increase, the amount of increase in the amount of ammonia oxidation is larger than the amount of increase in the amount of NOx reduction. In such a case, when the equivalent ratio is made to increase, the amount of increase of the NOx produced by ammonia being oxidized becomes more than the amount of NOx which is decreased by being reduced in the NOx catalyst 3, so the NOx reduction rate drops. That is, in cases where the gradient of the characteristic line is smaller than 1, the NOx reduction rate is dropped by making the equivalent ratio larger.

In this manner, whether the NOx reduction rate becomes larger or smaller when the equivalent ratio is made to increase varies with the gradient of a characteristic line in FIG. 2 (i.e., the ratio of the amount of increase in the amount of NOx reduction with respect to the amount of increase in the amount of ammonia oxidation). Then, the gradient of the characteristic line becomes smaller as the deterioration of the NOx catalyst 3 progresses.

Accordingly, in this embodiment, in cases where the amount of increase in the amount of NOx reduction is larger than the amount of increase in the amount of ammonia oxidation (i.e., in cases where the ratio of the amount of increase in the amount of NOx reduction with respect to the amount of increase in the amount of ammonia oxidation is larger than 1) when the equivalent ratio is made to increase, the equivalent ratio is made to increase. The equivalent ratio in this case becomes larger than 1. On the other hand, in cases where the amount of increase in the amount of ammonia oxidation is equal to or less than the amount of increase in the amount of NOx reduction (i.e., in cases where the ratio of the amount of increase in the amount of NOx reduction with respect to the amount of increase in the amount of ammonia oxidation is equal to or less than 1) when the equivalent ratio is made to increase, the equivalent ratio is set equal to or less than 1. Setting the equivalent ratio equal to or less than 1 also includes setting the equivalent ratio to 0, i.e., setting the amount of addition of the additive agent to 0.

Figure 5:
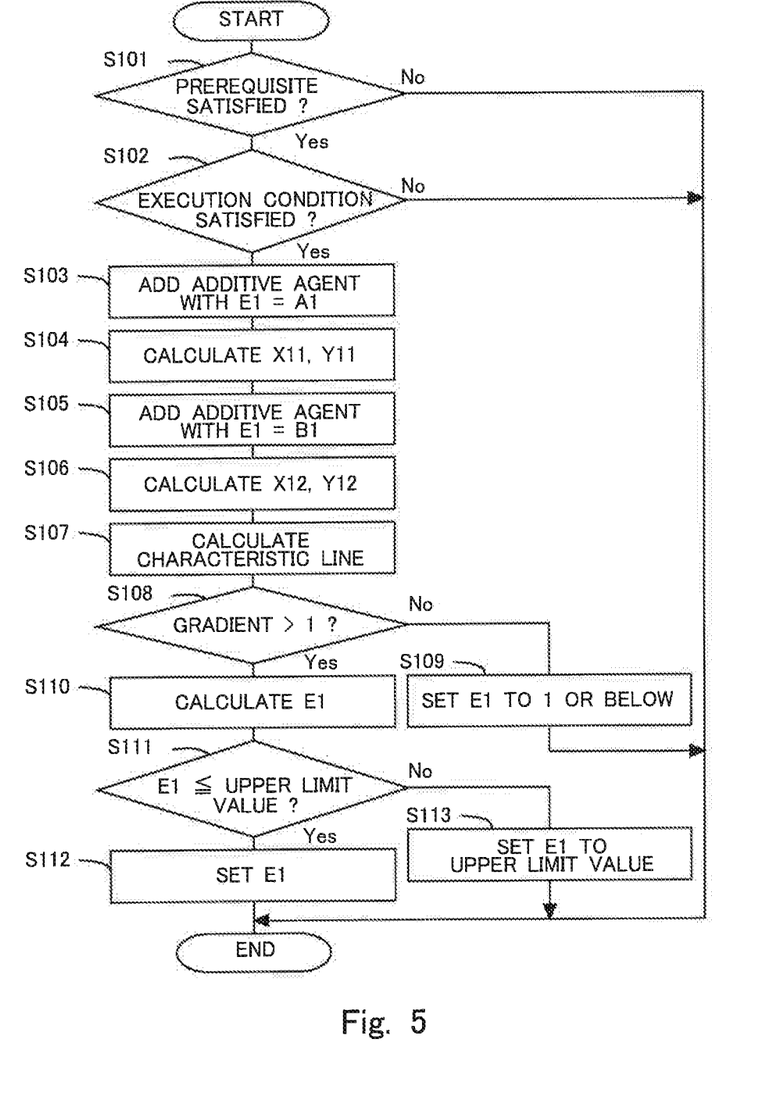
FIG. 5 is a flow chart showing a flow for equivalent ratio control according to this embodiment.

FIG. 5 is a flow chart showing a flow or routine for the equivalent ratio control according to this embodiment. The flow or routine in this flow chart is carried out by means of the ECU 10 in a repeated manner at each predetermined time interval. Here, note that in this embodiment, the ECU 10 functions as a controller in the present disclosure, by carrying out the flow or routine in the flow chart shown in FIG. 5.

In step S101, it is determined whether a prerequisite for carrying out the equivalent ratio control is satisfied. For example, when the temperature of the NOx catalyst 3 is equal to or larger than a predetermined temperature, a determination is made that the prerequisite is satisfied. Moreover, in this embodiment, the prerequisite also includes a case where the NOx reduction rate of the NOx catalyst 3 is smaller than a predetermined lower limit reduction rate. The predetermined lower limit reduction rate is an NOx reduction rate which corresponds to a lower limit value of an allowable range. Here, when the NOx reduction rate of the NOx catalyst 3 is equal to or more than the predetermined lower limit reduction rate, the NOx catalyst 3 exhibits sufficient purification (reduction) ability even if the equivalent ratio is not adjusted, so there is no need to adjust the equivalent ratio. In this case, it is not necessary to carry out the routine of this flow chart. In cases where an affirmative determination is made in step S101, the routine of the flow chart goes to step S102, whereas in cases where a negative determination is made, this routine is ended.

In step S102, it is determined whether the condition or prerequisite for carrying out the equivalent ratio control is satisfied. For example, when the internal combustion engine 1 is in steady state operation, a determination is made that the condition for carrying out the equivalent ratio control is satisfied. In cases where an affirmative determination is made in step S102, the routine goes to step S103, whereas in cases where a negative determination is made, this routine is ended.

In step S103, the equivalent ratio control with the equivalent ratio E1 set to A1 is carried out. The equivalent ratio A1 at this time is 1, for example. In addition, in cases where an affirmative determination is made in step S101 and in step S102, the equivalent ratio control has already been carried out by the ECU 10. For this reason, the equivalent ratio in the equivalent ratio control already carried out may be set as the equivalent ratio E1 in this step S103. That is, A1 may also be an equivalent ratio which has already been set. Here, note that A1 may also be set so that the gradient of a characteristic line can be calculated with a high degree of accuracy.

In step S104, the amount of NOx reduction X11 and the amount of ammonia oxidation Y11 are calculated by using the above-mentioned expressions 9 and 10. In this step S104, the amount of NOx reduction X11 and the amount of ammonia oxidation Y11 are calculated by using the detection values of the various kinds of sensors at a point in time at which a sufficient period of time has elapsed after the equivalent ratio E1 was set to A1 in step S103.

In step S105, the equivalent ratio control is carried out with the equivalent ratio E1 set to B1. This B1 is a value larger than A1. That is, the equivalent ratio is made to increase. B1 is set in such a manner that the gradient of a characteristic line can be calculated with a high degree of accuracy. Here, note that in this embodiment, the equivalent ratio E1 is set to the relatively small value in step S103, and then, the equivalent ratio E1 is set to a relatively large value in this subsequent step S105, but instead of this, the equivalent ratio E1 may be set to a relatively large value in step S103, and then, the equivalent ratio E1 may be set to a relatively small value in the subsequent step S105. That is, the equivalent ratio E1 need only be changed in such a manner that a characteristic line can be calculated.

In step S106, an amount of NOx reduction X12 and an amount of ammonia oxidation Y12 are calculated by using the above-mentioned expressions 9 and 10. In this step S106, the amount of NOx reduction X12 and the amount of ammonia oxidation Y12 are calculated by using the detection values of the various kinds of sensors at a point in time at which a sufficient period of time has elapsed after the equivalent ratio E1 was set to B1 in step S105.

In step S107, an expression representing a characteristic line is calculated based on the amount of NOx reduction X11 and the amount of ammonia oxidation Y11 calculated in step S104, and the amount of NOx reduction X12 and the amount of ammonia oxidation Y12 calculated in step S106.

In step S108, it is determined whether the gradient of the line calculated in step S107 is larger than 1. That is, it is determined whether the amount of increase in the amount of NOx reduction (X12-X11) is larger than the amount of increase in the amount of ammonia oxidation (Y12-Y11). In this step, it can be said that whether the NOx reduction rate rises or not is determined by making the equivalent ratio increase. In cases where an affirmative determination is made in step S108, the routine goes to step S110, whereas in cases where a negative determination is made, the routine goes to step S109.

In step S109, the equivalent ratio E1 is set equal to or less than 1. That is, because the deterioration of the NOx catalyst 3 progresses, the equivalent ratio is set equal to or less than 1 so as to suppress the oxidation of ammonia. The equivalent ratio may be 1, or may be 0. In addition, the equivalent ratio may also be set to a value which is larger than 0 and smaller than 1. The equivalent ratio set at this time has been obtained in advance by experiments, simulations or the like in consideration of the suppression of increase in the amount of oxidation of ammonia, as well as the suppression of decrease in the amount of reduction of NOx. Here, note that the equivalent ratio control is carried out by setting the equivalent ratio E1 to 1, for example, until the equivalent ratio E1 is adjusted according to this flow chart. In this case, the equivalent ratio control, which is different from this flow chart, is carried out by the ECU 10, and a target value of the equivalent ratio at that time is set to 1.

Figure 7:
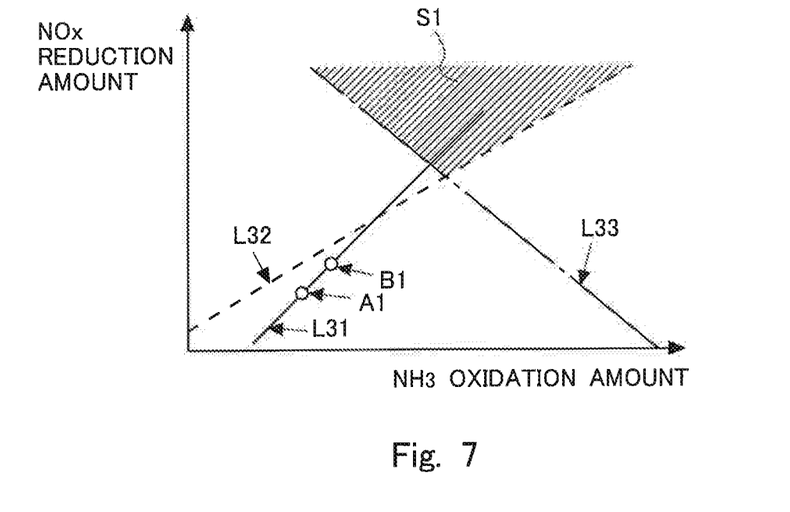
FIG. 7 is a view for explaining a method of calculating an equivalent ratio E1.

In step S110, the equivalent ratio E1 is calculated. The equivalent ratio E1 at this time may have been obtained in advance through experiments, simulations, or the like. In addition, the equivalent ratio E1 may be a fixed value. Here, note that in this embodiment, the NOx reduction rate is improved by making the equivalent ratio calculated at this time become larger than B1. Moreover, the equivalent ratio E1 may be increased gradually each time this step S110 is carried out, or the equivalent ratio E1 may be made not to increase, after this step S110 is once carried out. Further, as shown in FIG. 7 to be described later, E1 may be set in such a manner that the NOx reduction rate and the concentration of ammonia in the exhaust gas flowing out from the NOx catalyst 3 both fall within their allowable ranges, respectively.

In step S111, it is determined whether the equivalent ratio E1 calculated in step S110 is equal to or less than an upper limit value. This upper limit value is a condition which is decided according to the specification of the addition valve 4, and is set based on a maximum value of the amount of additive agent which can be added from the addition valve 4 per unit time. In cases where an affirmative determination is made in step S111, the routine goes to step S112, where the equivalent ratio E1 is set to the value which was calculated in step 110. On the other hand, in cases where a negative determination is made in step S111, the routine goes to step S113, where the equivalent ratio E1 is set to the upper limit value.

Figure 6:
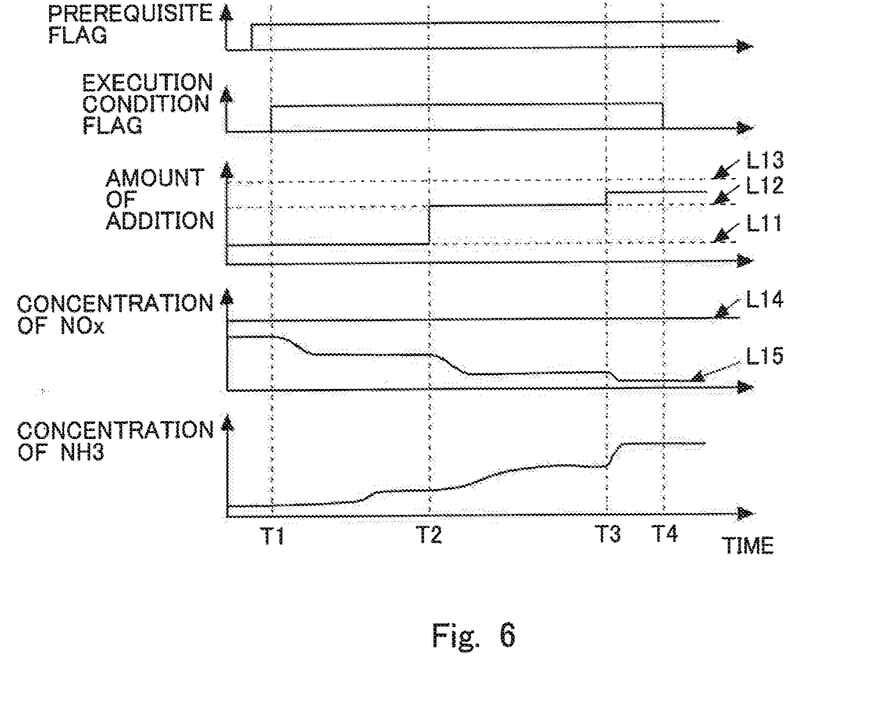
FIG. 6 is a time chart showing the changes over time of a variety of kinds of values in cases where a slope or gradient of a characteristic line is larger than 1.

FIG. 6 is a time chart showing the changes over time of a variety of kinds of values in cases where the gradient of a characteristic line is larger than 1. In order from the top, there are shown a prerequisite flag, an execution condition flag, the amount of addition of the additive agent, the concentration of NOx, and the concentration of ammonia (the concentration of $NH_3$). The prerequisite flag is a flag which is set to 1 in cases where the prerequisite in step S101 is satisfied, and which is set to 0 in cases where it is not satisfied. In addition, the execution condition flag is a flag which is set to 1 in cases where the condition for carrying out the equivalent ratio control in step S102 is satisfied, and which is set to 0 in cases where it is not satisfied. L11 in the amount of addition of the additive agent indicates an amount of additive agent corresponding to when the equivalent ratio E1 is A1; L12 indicates an amount of additive agent corresponding to when the equivalent ratio E1 is B1; and L13 indicates a maximum value of the amount of additive agent which can be add by the addition valve 4. In addition, L14 in the concentration of NOx indicates the concentration of NOx in the exhaust gas flowing into the NOx catalyst 3, and this also indicates the detected value of the first NOx sensor 11. In FIG. 6, the concentration of NOx in the exhaust gas flowing into the NOx catalyst 3 is fixed or constant. Moreover, L15 indicates the concentration of NOx in the exhaust gas flowing out from the NOx catalyst 3, and this also indicates the detected value of the second NOx sensor 14. The concentration of ammonia (the concentration of $NH_3$) indicates the concentration of ammonia in the exhaust gas flowing out from the NOx catalyst 3, and this also indicates the detected value of the ammonia sensor 15.

In FIG. 6, the equivalent ratio control has been carried out before T1, and the amount of addition of the additive agent at that time is set to L11. Before T1, the prerequisite flag has been set to 1, and at T1, the execution condition flag is set to 1. With this, from T1, the equivalent ratio E1 is set to A1. That is, the amount of addition of the additive agent from the addition valve 4 is adjusted so that the equivalent ratio E1 becomes A1. The state where the equivalent ratio E1 is set to A1 continues until T2. The concentration of NOx and the concentration of ammonia are respectively detected in a period of time from T1 to T2, whereby the amount of NOx reduction X11 and the amount of ammonia oxidation Y11 are calculated. From T2, the equivalent ratio E1 is set to B1. That is, the amount of addition of the additive agent from the addition valve 4 is adjusted so that the equivalent ratio E1 becomes B1. The state where the equivalent ratio E1 is set to B1 continues until T3. The concentration of NOx and the concentration of ammonia are respectively detected in a period of time from T2 to T3, whereby the amount of NOx reduction X12 and the amount of ammonia oxidation Y12 are calculated. Then, the gradient of a characteristic line is obtained until T3. In FIG. 6, there is shown a case where the gradient is larger than 1, and hence, the equivalent ratio E1 after T3 is set larger than 1, and is further set to become larger than A1 and B1.

Then, FIG. 7 is a view for explaining a method of calculating the equivalent ratio E1. In this figure, an axis of abscissa represents the amount of ammonia oxidation, and an axis of ordinate represents the amount of NOx reduction. L31 is a characteristic line; L32 is a target reduction rate line; and L33 is a slip allowance line at the time when the equivalent ratio E1 is A1. The target reduction rate line L32 is a line which represents the relation between the amount of ammonia oxidation and the amount of NOx reduction at the time when the NOx reduction rate becomes a target value. In addition, the slip allowance line L33 is a line which represents the relation between the amount of ammonia oxidation and the amount of NOx reduction at the time when the concentration of ammonia in the exhaust gas flowing out from the NOx catalyst 3 becomes an upper limit value of its allowable range (a predetermined upper limit concentration). The target reduction rate line L32 and the slip allowance line L33 may be decided by the values regulated by regulations, laws, etc. A point indicated by "E1=A1" is a point in the case of adding the additive agent by setting the equivalent ratio E1 to A1 which is a relatively small value, and a point indicated by "E1=B1" is a point in the case of adding the additive agent by setting the equivalent ratio E1 to B1 which is a relatively large value.

A region above the target reduction rate line L32 is a region in which the NOx reduction rate falls within its allowable range. In addition, a region above the slip allowance line L33 is a region in which the concentration of ammonia in the exhaust gas flowing out from the NOx catalyst 3 falls within its allowable range. That is, by adjusting the equivalent ratio E1 so that the amount of ammonia oxidation and the amount of NOx reduction fall within a range indicated by hatching in FIG. 7 (hereinafter, referred to as a performance achievement range), the NOx reduction rate and the concentration of ammonia in the exhaust gas flowing out from the NOx catalyst 3 both fall within their allowable ranges.

Here, when the target value of the NOx reduction rate is represented by NOx_TRG, it is necessary to satisfy the following expression 11.

$$((NOx\_IN-NOx\_OUT)/NOx\_IN) \cdot 100 \geq NOx\_TRG \quad \text{Expression 11}$$

When modifying expression 11 above by using the aforementioned expression 2, the following expression 12 can be derived.

$$Y1 \geq X1 + NOx\_TRG/100 \quad \text{Expression 12}$$

When a lower limit value of the allowable range of the concentration of ammonia in the exhaust gas flowing out from the NOx catalyst 3 is represented by C1, the following expression 13 is established.

$$NH3\_OUT \leq C1 \quad \text{Expression 13}$$

In addition, there is the relation of the following expression 14.

$$X1+Y1+NH3\_OUT = E1 \cdot NOx\_IN \quad \text{Expression 14}$$

From expressions 13 and 14 above, the following expression 15 can be derived.

$$Y1 \geq -X1 + (E1 \cdot NOx\_IN - C1) \quad \text{Expression 15}$$

Then, the performance achievement range can be obtained from the aforementioned expression 2 and expression 15 above.

Figure 8:
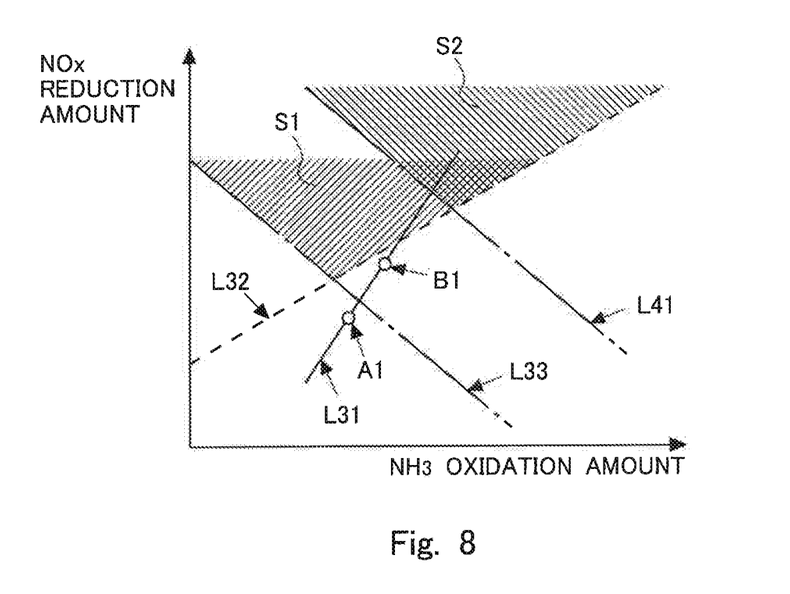
FIG. 8 is a view showing the relation between a performance achievement range S1 at the time when the equivalent ratio E1 is A1, and a performance achievement range S2 at the time when the equivalent ratio E1 is B1.

However, as can be seen from expression 15 above, the relation indicated in FIG. 7 may change with the equivalent ratio E1. That is, the slip allowance line indicated by L33 in FIG. 7 changes with the equivalent ratio, so the performance achievement range changes with the equivalent ratio E1. Here, FIG. 8 is a view showing the relation between a performance achievement range S1 at the time when the equivalent ratio E1 is A1, and a performance achievement range S2 at the time when the equivalent ratio E1 is B1. In FIG. 8, L31 indicates a characteristic line; L33 indicates a slip allowance line at the time when the equivalent ratio E1 is A1; L41 indicates a slip allowance line at the time when the equivalent ratio E1 is B1; L32 indicates a target reduction rate line; S1 indicates a performance achievement range at the time when the equivalent ratio E1 is A1; and S2 indicates a performance achievement range at the time when the equivalent ratio E1 is B1. The slip allowance line L41 at the time when the equivalent ratio E1 is B1 is located at a side at which the amount of NOx reduction and the amount of ammonia oxidation become larger than those in the slip allowance line L33 at the time when the equivalent ratio E1 is A1. For that reason, the performance achievement range S2 at the time when the equivalent ratio E1 is B1 is located at a side (an upper side in FIG. 8) at which the amount of NOx reduction and the amount of ammonia oxidation become larger than those in the performance achievement range S1 at the time when the equivalent ratio E1 is A1. In this manner, the larger the equivalent ratio E1 becomes, the more the slip allowance line moves to the side at which the amount of NOx reduction and the amount of ammonia oxidation become larger. For that reason, the larger the equivalent ratio E1 becomes, the more the performance achievement range also moves to the side at which the amount of NOx reduction and the amount of ammonia oxidation become larger. Accordingly, by obtaining the equivalent ratio E1 with which when the equivalent ratio E1 is made to change, a point moving on a characteristic line falls in the performance achievement range, the NOx reduction rate in the NOx catalyst 3 and the concentration of ammonia in the exhaust gas flowing out from the NOx catalyst 3 can be made to fall within their allowable ranges.

Here, note that the equivalent ratio E1 set as mentioned above may have been stored in the ECU 10, so that learning control may be carried out in which at the time of the next same condition, the equivalent ratio is set to the same value thus stored. In addition, in order to set the equivalent ratio corresponding to the degree of the deterioration of the NOx catalyst 3, the equivalent ratio may be set each time a vehicle having the internal combustion engine 1 mounted thereon travels a predetermined distance.

As described above, according to this embodiment, even if the NOx reduction rate in the NOx catalyst 3 is in a state lower than the predetermined lower limit reduction rate when the NOx catalyst 3 is at high temperature, the NOx reduction rate can be improved by adjusting the equivalent ratio. That is, the additive agent can be supplied to the NOx catalyst 3 in a suitable manner.

The invention claimed is:

1. An exhaust gas purification apparatus for an internal combustion engine comprising:
    an NOx selective catalytic reduction catalyst that is arranged in an exhaust passage of the internal combustion engine and selectively reduces NOx in an exhaust gas by using ammonia as a reducing agent;
    an addition valve that is arranged in said exhaust passage at the upstream side of said NOx selective catalytic reduction catalyst and configured to add an additive agent, which is ammonia or a precursor of ammonia, into the exhaust gas;
    a temperature sensor configured to acquire a temperature of said NOx selective catalytic reduction catalyst; and
    a controller configured to carry out equivalent ratio control in which an amount of the additive agent corresponding to an amount of NOx flowing into said NOx selective catalytic reduction catalyst and an equivalent ratio is added from said addition valve;
    wherein in cases where the temperature acquired by said temperature sensor is equal to or higher than a predetermined temperature at which ammonia is oxidized, and in cases where an NOx reduction rate in said NOx selective catalytic reduction catalyst is smaller than a predetermined lower limit reduction rate, when the addition of the additive agent from said addition valve is carried out at least twice by changing the equivalent ratio with respect to the amount of NOx flowing into said NOx selective catalytic reduction catalyst, said controller configured to make the equivalent ratio in said equivalent ratio control larger in the case where an amount of change of an amount of reduction of NOx accompanying a change of the equivalent ratio is larger than an amount of change of the amount of oxidation of ammonia accompanying the change of the equivalent ratio, than in the case where the amount of change of the amount of reduction of NOx accompanying the change of the equivalent ratio is smaller than the amount of change of the amount of oxidation of ammonia accompanying the change of the equivalent ratio.

2. The exhaust gas purification apparatus for the internal combustion engine as set forth in claim 1, wherein
    in cases where said amount of change of the amount of reduction of NOx is larger than said amount of change of the amount of oxidation of ammonia, said controller is configured to make the equivalent ratio in said equivalent ratio control larger than 1.

3. The exhaust gas purification apparatus for the internal combustion engine as set forth in claim 2, wherein
    in cases where said amount of change of the amount of reduction of NOx is larger than said amount of change of the amount of oxidation of ammonia, said controller is further configured to adjust the equivalent ratio in said equivalent ratio control in such a manner that the concentration of ammonia in the exhaust gas flowing out from said NOx selective catalytic reduction catalyst becomes equal to or less than a predetermined upper limit concentration.

4. The exhaust gas purification apparatus for the internal combustion engine as set forth in claim 2, wherein
    said controller is further configured to adjust the equivalent ratio in said equivalent ratio control in such a manner that the NOx reduction rate in said NOx selective catalytic reduction catalyst becomes equal to or more than said predetermined lower limit reduction rate.

5. The exhaust gas purification apparatus for the internal combustion engine as set forth in claim 1, wherein
    in cases where said amount of change of the amount of reduction of NOx is equal to or less than said amount of change of the amount of oxidation of ammonia, said controller is further configured to make the equivalent ratio in said equivalent ratio control equal to or less than 1.

* * * * *